Patented Apr. 11, 1944

2,346,243

UNITED STATES PATENT OFFICE 2,346,243

METHOD OF TREATING PIGMENT, AND PRODUCT

Alfred D. Wilson, Westbrook, Maine, assignor to S. D. Warren Company, Boston, Mass., a corporation of Massachusetts No Drawing. Application November 18, 1940, Serial No. 366,173

12 Claims. (Cl. 106—306)

This invention relates to pigments and methods of treating the same to improve their suitability for use in compositions for coating paper and for other uses where reduced adsorptive qualities are valuable. The invention is concerned also with mineral coating compositions for paper which compositions contain pigments which have been treated in accordance with said method.

In pigments for use in casein paints or in coating compositions for making mineral-coated paper, a low adhesive requirement is most desirable. The adhesive requirement of a pigment may be defined as the quantity of adhesive, such as casein, starch, glue or the like, which is required to bind a fixed quantity of the pigment satisfactorily in the use to which it is to be put. While the actual adhesive requirement of any pigment will naturally vary, depending upon the conditions under which the pigment is used, comparative figures can be obtained for different pigments by testing them under the same fixed conditions. A common method of making such a test is to coat a series of sheets of standard paper with a standard weight of coating, varying the proportion of adhesive to pigment in the coatings applied to different sheets, and to subject the dried coatings to the pull of sealing-wax. A convenient wax to use is the Number 4 or 4A wax from the graded series of the widely used Dennison paper-testing waxes, for the pull that that test wax exerts on a mineral coating is ordinarily of the same order as that exerted by the usual type of printing ink used for printing coated paper on a letter press. If, then, for each pigment the minimum quantity of adhesive is determined which will bind 100 parts by weight of the pigment against "picking" or lifting by the No. 4 or 4A Dennison wax, the comparative adhesive requirements are immediately obtained.

The alkaline earth metal pigments comprising calcium carbonate, magnesium carbonate, mixed calcium carbonate-magnesium hydroxide, mixed calcium carbonate-magnesium carbonate, etc., have relatively good hiding power and good whiteness. Such pigments, however, especially those containing magnesium compounds or calcium carbonate of extremely fine particle size, tend to have undesirably high adhesive requirements. Moreover, the more finely divided such pigments are, and in consequence the more desirable they are from consideration of opacity, finishing quality, etc., the higher are their normal adhesive requirements. Such pigments are easily and cheaply made by carbonation of high calcium or magnesium limes by carbonic acid or soluble carbonates, or by precipitation from solutions of calcium and/or magnesium salts; but in the past their high adhesive requirements have been a factor in limiting the use of these otherwise very desirable pigments.

For many years, calcium carbonate or "lime-sludge" resulting from the causticization of soda ash with burnt or slaked lime has been ground in a pebble-mill and then used as a pigment in coating paper. A common commercial practice has been to grind the carbonate in an aqueous slurry of about 50% solids content for from about 4 to 8 hours in a pebble mill. Such grinding has been practically necessary to insure freedom from small lumps or aggregates in the slurry. A concomitant result of the grinding, however, has been a substantial reduction in the adhesive requirement of the pigment. A typical example of the decrease in adhesive requirement given by such conventional grinding is in the order of 20% to 30% reduction. Lime sludge so treated has long been used in the coating of so-called dull-coated paper and as a minor ingredient in the coating of many so-called glossy-coated papers.

The lime-sludge pigment described is fairly coarse in particle size, and is not entirely satisfactory for use as a major ingredient in coatings for glossy-coated papers: However, many superior substitutes of finer particle size are available, including gas precipitated calcium carbonate, calcium carbonate produced by causticization under carefully controlled temperature conditions, the product made by treating dolomitic lime with a carbonate or carbonic acid, and the like. The latter pigments are generally of finer particle size than usual waste lime-sludge and their fluid aqueous dispersions are of considerably lower solids content than those of lime-mud. It is found that when such low-solids suspensions of fine particle carbonate are ground in a ball-mill little reduction in adhesive requirement results.

The present invention provides a method of treatment for pigments of the class mentioned whereby the adhesive requirement is materially reduced, so that the pigments may be more readily used in coating compositions for coated printing papers. Moreover, by markedly increasing the fluidity of the pigment suspensions it at the same time facilitates handling, as by pumping.

Accordingly, an object of the invention is to produce alkaline earth metal pigments of the class comprising calcium carbonate, magnesium carbonate, mixed calcium carbonate-magnesium hydroxide, mixed calcium carbonate-magnesium carbonate, and the like, which pigments shall have adhesive requirements materially less than the untreated pigment. Another object is to reduce the adsorptive capacity of calcium and magnesium pigments. A specific object is the reduction of the casein requirement of finely divided precipitated calcium carbonate. Another object is to increase the fluidity of calcium carbonate suspensions.

In the practice of the invention it is found that pigments such as calcium carbonate, magnesium carbonate, or mixtures of the two, or mixed calcium carbonate-magnesium hydroxide, or the like, such as are produced by known methods of precipitation, may have their adhesive requirements reduced by treating with a deflocculating agent, e. g., gum arabic, casein, modified starch, Irish moss, etc., a relatively concentrated aqueous suspension of the pigment, preferably one of such concentration that it would not ordinarily be fluid except for the presence of the deflocculating agent, and grinding and/or dispersing the fluid slurry.

The use of a deflocculating agent is especially beneficial in grinding pigments of very fine particle size, such as near-colloidal calcium carbonate, for in such a case the deflocculating agent by its presence not only improves the efficiency of the grinding but also makes possible grinding at a considerably higher concentration of solids than would otherwise be possible.

In fact it is generally true that the higher the density at which the pigment slurry is ground the lower will be the adhesive requirement of the treated pigment; and it usually follows that the greatest advantage under the invention is obtained when the pigment is ground at the highest possible concentration which still yields a sufficiently fluid slurry.

In preparing the pigment for treatment according to the concept of the present invention, the dry pigment may be made into a paste with water, or the pigment during its process of manufacture may be concentrated by sedimentation or by filter-pressing, or in other ways. In general the concentration of the pigment with respect to the water should be relatively high. In the case of some magnesium carbonates it may be necessary to operate at a concentration below 30% in order to achieve sufficient fluidity thereof for the grinding treatment; in the case of calcium carbonate, however, and of mixed calcium and magnesium pigments in which the major portion is calcium carbonate, it is usually possible to operate at a considerably higher concentration, such as above 40%. However, addition of deflocculating agent before grinding is beneficial to some extent at any concentration, though the effect is more marked at higher concentrations, especially at concentrations so high that grinding would not be practicable in the absence of said agent.

In pebble-mill grinding, best results are obtained when the consistency of the slurry is thin enough so that the fall of the pebbles in the mill is not impeded, but thick enough so that the slurry will not completely flow away from the pebbles and so escape the grinding action. For colloid mill treatment that consistency is preferred which is the highest at which the slurry will readily feed through the mill.

The degree of pebble-milling necessary to achieve the desired results according to the invention is, generally speaking, of the same order as that which has been given lime-sludge in past commercial practice. In fact, pebble-milling the deflocculated slurry for a period of time considerably less than lime-sludge has frequently been commercially milled is usually sufficient to give the results desired under the invention. Treatment of the deflocculated calcium carbonate slurry in colloid mills employing a definite clearance between rapidly moving members for a relatively brief period is also effective in markedly reducing the adhesive requirement of the pigment. Passage of the deflocculated slurry through a Bennett disperser such as described in U. S. Patent No. 1,792,067 is likewise effective in reducing adhesive requirement according to the invention. All these treatments are encompassed in the expression "grinding treatment" as used in the appended claims.

Since the best condition for grinding is at the highest concentration possible while maintaining the desired fluidity, it is found that the optimum concentration of pigment is one that in the absence of the deflocculating agent would give a non-fluid paste. Generally speaking, in the case of calcium carbonates the optimum concentration will be 50% or more while in the case of the magnesium compounds the optimum concentration will usually be somewhat lower than 50%.

Of the deflocculating agents, gum arabic is sometimes preferred, for this gum is especially effective in suspensions of calcium carbonate, provided the calcium carbonate has been properly prepared. In the case of calcium carbonate made by the action of slaked lime on soda ash, however, it may happen that substantially all the soluble alkali (exclusive of the alkali derived from the calcium carbonate itself) and other impurities have not been removed from the product. In that event, it may be found that gum arabic exerts little or no influence on such impure calcium carbonate, but becomes effective, in the present connection, as soon as such soluble impurities have been removed or sufficiently reduced, as by washing or, less preferably, by neutralization with acid. On the other hand, casein (either milk casein or soy bean casein) is less sensitive to the presence of soluble alkali in the pigment and may be used satisfactorily as the deflocculating agent in some cases where gum arabic is ineffective, although the effect of casein may be somewhat less marked than that of gum arabic under the best conditions. In general, however, gum arabic, milk casein, soy bean casein, oxidized starch, and Irish moss, all give excellent results as deflocculating agents according to the invention.

The preferred proportion of deflocculating agent to pigment is that which will result in a suspension of maximum fluidity. Generally speaking, from about 0.25% to about 5.0% of deflocculating agent (based on the dry weight of pigment present) includes the preferred working range; in most cases 1% to 2% of deflocculating agent is sufficient. Naturally, the exact optimum proportion will vary somewhat depending both upon the particular pigment and the particular deflocculating agent used; in every case, however, the proportion of deflocculant to pigment is very materially smaller than the proportion that would be required to bind that same pigment satisfactorily if the same deflocculant were used as coating adhesive.

It is to be noted that while, as has been previously mentioned, lime-sludge has been pebble-milled in the past with consequent reduction in adhesive requirement, the adhesive requirement of the same lime-sludge may be still further considerably reduced by grinding treatment in the presence of a deflocculant according to the present invention.

The following examples show the effect of the practice of the invention in various cases:

Example 1

To a thick aqueous slurry of lime mud of 48.2% solids 1% of gum arabic was added, and the mixture was ground 4 hours in a pebble-mill.

Casein requirement of the untreated pigment _____ 13½
Casein requirement after grinding _____ 7½

Example 2

A light precipitated chalk was made into an aqueous slurry of 39% solids, 1% of gum arabic was added, and the mixture was ground for 4 hours in a pebble-mill.

Casein requirement of the untreated pigment _____ 33
Casein requirement after grinding _____ 19

Example 3

Light magnesium carbonate was made into an aqueous paste of 21% solids, admixed with 2% of gum arabic and ground 4 hours in a pebble mill.

Casein requirement of the untreated pigment _____ 85
Casein requirement after grinding _____ 44

Example 4

A calcium carbonate filter cake of 40% solids was admixed with 1% of gum arabic, and ground for 4 hours in a pebble mill.

Starch requirement of the untreated pigment _____ 42
Starch requirement after grinding _____ 33

Example 5

Calcium carbonate sludge of 40% solids was mixed with 1% of gum arabic, and the slurry was run through a colloid mill.

Casein requirement of the untreated pigment _____ 20
Casein requirement after grinding _____ 15

Example 6

A calcium carbonate-magnesium hydroxide pigment made by causticising dolomitic lime with soda ash was obtained in the form of a filter cake of 37.5% solids. This was mixed with 1½% of gum arabic, and ground for 4 hours in a pebble mill.

Casein requirement of the untreated pigment _____ 31
Casein requirement after grinding _____ 27

Example 7

A lime-sludge from a causticizing plant was found to have a casein requirement of 16. The sludge was ground for 4 hours in a pebble-mill, and then dried in a rotary drier. The casein requirement of the dried product was 11. The dry powder was made up into an aqueous slurry at 70% solids with water containing gum arabic equal to 1% of the dry weight of pigment. The slurry was ground 2 hours in a pebble mill. The resulting casein requirement was 7.

Example 8

Calcium carbonate sludge was deflocculated with 2% of milk casein solubilized by ammonia to yield a suspension of 40.1% pigment concentration, which was ground in a pebble-mill for 4 hours. The casein requirement before grinding was 20. The casein requirement after grinding including the casein used as deflocculant was 16.

Example 9

Calcium carbonate sludge was deflocculated with 1% of soy bean casein and ground in a pebble-mill at 40% pigment concentration for 4 hours. Casein requirement before grinding was 20; after grinding, including defloculant, was 16.

The preceding figures stated as adhesive requirements were the minimum quantities of adhesive used, in parts by weight, with 100 parts by weight of the pigment in question that did not show weakness when a 14 pound coating (25 x 38—500 sheet ream) thereof was tested with a No. 4A Dennison wax.

By "non-fluid" as used in the foregoing description and in the appended claims is meant a pasty consistency of wet pigment which is too thick to be poured in a uniform stream.

By treating pigments of the class specified, and in particular calcium carbonate, in relatively concentrated aqueous suspension, with a small amount of deflocculating agent and grinding the slurry, pigments of improved qualities result which have reduced adhesive requirements. It is obvious that the saving in adhesive resulting from the practice of the invention materially reduces the cost of coating paper. Moreover, other benefits accrue from the increased fluidity of the coating mixtures themselves, as well as improvement in surface characteristics of the coated paper.

It is not known that the grinding given according to the invention actually reduces the size of the individual crystals making up the pigment. Indeed it seems more likely that it acts by breaking up aggregates and dispersing the individual particles in the aqueous medium. The term "grinding" as used in the specification and claims is, therefore, intended to embrace the action of various efficient dispersing means such as a pebble-mill, a colloid mill, a Bennett disperser, and the like.

By the term "calcium carbonate sludge" as used herein is meant calcium carbonate produced by the causticizing process or a process by which the carbonate is precipitated in the presence of considerable sodium hydroxide.

This application contains subject matter in common with that of my copending application Serial No. 140,048, filed April 30, 1937.

I claim:

1. Method of treating a pigment of the group consisting of calcium carbonate, magnesium carbonate, mixed calcium carbonate-magnesium carbonate, and mixed calcium carbonate-magnesium hydroxide, which comprises subjecting to a grinding treatment an aqueous suspension of the pigment mixed with a deflocculating agent, the aqueous suspension of pigment being at such concentration that in the absence of the deflocculating agent the suspension would be non-fluid and containing the deflocculating agent in an amount between 0.25% and 5% by weight based on the dry weight of said pigment by which grinding treatment the adhesive requirement of said pigment is materially reduced.

2. Method of treating a pigment of the group consisting of calcium carbonate, magnesium carbonate, mixed calcium carbonate-magnesium carbonate, and mixed calcium carbonate-magnesium hydroxide, which comprises grinding an aqueous suspension of the pigment mixed with gum arabic, the aqueous suspension of pigment being at such concentration that in the absence of the gum arabic the suspension would be non-fluid and containing the gum arabic in an amount between 0.25% and 5% by weight based on the dry weight of said pigment.

3. Method of treating a pigment of the group consisting of calcium carbonate, magnesium carbonate, mixed calcium carbonate-magnesium carbonate, and mixed calcium carbonate-magnesium hydroxide, which comprises subjecting to a grinding treatment an aqueous suspension of the pigment mixed with casein, the aqueous suspension of pigment being at such concentration that in the absence of the casein the suspension would be non-fluid and containing the casein in an amount between 0.25% and 5% by weight based on the dry weight of said pigment.

4. Method of treating a pigment of the group consisting of calcium carbonate, magnesium carbonate, mixed calcium carbonate-magnesium carbonate, and mixed calcium carbonate-magnesium hydroxide, which comprises subjecting to a grinding treatment an aqueous suspension of the pigment mixed with starch, the aqueous suspension of pigment being at such concentration that in the absence of the starch the suspension would be non-fluid and containing the starch in an amount between 0.25% and 5% by weight based on the dry weight of said pigment.

5. In the treatment of pigments of the group consisting of calcium carbonate, magnesium carbonate, mixed calcium carbonate-magnesium carbonate, and mixed calcium carbonate-magnesium hydroxide, the method of reducing the adhesive requirement of the pigment which comprises freeing the pigment of substantially all soluble alkali, preparing a fluid aqueous suspension of the pigment admixed with from about 0.25% to about 5% by weight of gum arabic, the aqueous suspension of pigment being at such concentration that in the absence of the gum arabic the suspension would be non-fluid, and grinding the pigment slurry.

6. The process of treating calcium carbonate which comprises removing substantially all soluble alkali therefrom, preparing an aqueous suspension of the alkali-free calcium carbonate said suspension containing gum arabic in an amount between 0.25% and 5% by weight based on the dry weight of the calcium carbonate, and grinding the resulting slurry until the adhesive requirement of the pigment has been substantially reduced.

7. The process of treating an aqueous alkaline-reacting calcium carbonate sludge which comprises removing substantially all soluble alkali therefrom and concentrating the aqueous residue to at least 50% solids, mixing the resulting aqueous sludge with gum arabic in an amount by weight equivalent to from about 0.25% to about 5.0% by weight of the dry solids content, and grinding the resulting slurry until the adhesive requirement of the calcium carbonate has been substantially reduced.

8. The process of treating an aqueous alkaline-reacting calcium carbonate sludge which comprises washing the same to decrease the soluble alkali content thereof and concentrating the aqueous residue until it is no longer fluid, mixing the resulting aqueous sludge with gum arabic in an amount by weight equivalent to from about 0.25% to about 5.0% by weight of the dry solids content, and grinding the resulting slurry until the adhesive requirement of the calcium carbonate has been substantially reduced.

9. An aqueous mineral coating composition comprising water, a water-soluble adhesive component, and a mineral pigment component, said mineral pigment component consisting essentially of finely subdivided, ground pigment particles of a member of the group consisting of calcium carbonate, magnesium carbonate, calcium carbonate-magnesium carbonate, and calcium carbonate-magnesium hydroxide carrying on their surfaces a deflocculating agent in an amount insufficient in itself to exert a binding effect on the pigment particles but not less than about 0.25% by weight based on the dry weight of the pigment, which mineral pigment component is characterized in that its adhesive requirement has been materially reduced by grinding an aqueous suspension of said pigment mixed with said deflocculating agent at such concentration that, in the absence of said deflocculating agent, the suspension would be non-fluid.

10. Method of treating a calcium carbonate pigment, which comprises subjecting to a grinding treatment an aqueous suspension of the pigment mixed with a deflocculating agent, the aqueous suspension of pigment being at such concentration that in the absence of the deflocculating agent the suspension would be non-fluid and containing the deflocculating agent in an amount between 0.25% and 5% by weight based on the dry weight of said pigment by which grinding treatment the adhesive requirement of said pigment is materially reduced.

11. An aqueous mineral paper coating composition consisting essentially of water, a water-dispersible adhesive and a finely divided mineral pigment of the group consisting of calcium carbonate, magnesium carbonate, calcium carbonate-magnesium carbonate and calcium carbonate-magnesium hydroxide, whose adhesive requirement has been substantially reduced by a pre-treatment of the same by the deflocculating and grinding method defined in claim 1.

12. An aqueous mineral paper coating composition consisting essentially of water, a water-dispersible adhesive and a finely divided mineral adhesive and finely divided calcium carbonate pigment whose adhesive requirement has been substantially reduced by a pre-treatment of the same by the deflocculating and grinding method defined in claim 10.

ALFRED D. WILSON.